US011479078B2

(12) United States Patent
Yun

(10) Patent No.: US 11,479,078 B2
(45) Date of Patent: Oct. 25, 2022

(54) MULTI-ZONE AIR CONDITIONER SYSTEM FOR LARGE VEHICLES AND CONTROL METHOD THEREOF

(71) Applicants: Hyundai Motor Company, Seoul (KR); Kia Motors Corporation, Seoul (KR)

(72) Inventor: Nam-Seok Yun, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 179 days.

(21) Appl. No.: 16/910,365

(22) Filed: Jun. 24, 2020

(65) Prior Publication Data

US 2020/0317021 A1 Oct. 8, 2020

Related U.S. Application Data

(62) Division of application No. 15/810,424, filed on Nov. 13, 2017, now abandoned.

(30) Foreign Application Priority Data

Dec. 15, 2016 (KR) ........................ 10-2016-0171427

(51) Int. Cl.
*B60H 1/00* (2006.01)
(52) U.S. Cl.
CPC ..... *B60H 1/00371* (2013.01); *B60H 1/00064* (2013.01); *B60H 1/0075* (2013.01);
(Continued)

(58) Field of Classification Search
CPC combination set(s) only.
See application file for complete search history.

(56) References Cited

U.S. PATENT DOCUMENTS 6,926,601 B2  8/2005 Aoki
2004/0164171 A1  8/2004 Eisenhour
(Continued)

FOREIGN PATENT DOCUMENTS

CN  204605450 U  9/2015
EP  1486362 A2  12/2004
(Continued)

OTHER PUBLICATIONS

"ASW"; Auto Service World, "Sunload Sensors Explained", published Apr. 1, 2009, accessed Mar. 22, 2022, URL https://www.autoserviceworld.com/jobbernews/sunload-sensors-explained/#:~:text=Sunload%20sensors%20monitor%20the%20intensity, speaker%20grill%2C%20or%20defroster%20vent. (Year: 2009).*
(Continued)

*Primary Examiner* — Ko-Wei Lin
(74) *Attorney, Agent, or Firm* — Morgan, Lewis & Bockius LLP

(57) ABSTRACT

A multi-zone air conditioner system for large vehicles may include an air conditioning device configured to partition an internal of a vehicle into a plurality of zones to independently cool each zone, a detecting device configured to include a room temperature detector for detecting a room temperature of each zone and a photo detector for detecting an amount of solar radiation, an input device configured to switch an operating state of the air conditioning device to an automatic mode or a manual mode, and a control device configured to generate a control signal for operating the air conditioning device based on a signal transmitted from the detecting device and the input device.

6 Claims, 10 Drawing Sheets

(52) U.S. Cl.
CPC ..... *B60H 1/00742* (2013.01); *B60H 1/00964* (2013.01); *B60H 1/00985* (2013.01)

(56) References Cited

U.S. PATENT DOCUMENTS

| | | | |
|---|---|---|---|
| 2005/0039902 A1 | 2/2005 | Oga et al. | |
| 2013/0092364 A1* | 4/2013 | Kumar | F24F 11/30 |
| | | | 165/237 |
| 2013/0232996 A1* | 9/2013 | Goenka | B60H 1/00742 |
| | | | 62/3.61 |
| 2013/0317728 A1 | 11/2013 | Hall | |
| 2013/0325259 A1 | 12/2013 | Kwon et al. | |
| 2018/0297443 A1* | 10/2018 | Gibble | B60H 1/00842 |
| 2018/0312031 A1* | 11/2018 | Baker | B60H 1/00742 |

FOREIGN PATENT DOCUMENTS

| | | |
|---|---|---|
| JP | 08-132849 A | 5/1996 |
| JP | 2005-035400 A | 2/2005 |
| KR | 10-2013-0136060 A | 12/2013 |

OTHER PUBLICATIONS

Office Action of Chinese Patent Office dated Mar. 17, 2022, in Appl'n No. 201711212521.3.

\* cited by examiner

MULTI-ZONE AIR CONDITIONER SYSTEM FOR LARGE VEHICLES AND CONTROL METHOD THEREOF

CROSS-REFERENCE(S) TO RELATED APPLICATIONS

The present application is a Divisional of U.S. patent application Ser. No. 15/810,424, filed Nov. 13, 2017, which claims priority to Korean Patent Application No. 10-2016-071427, filed on Dec. 15, 2016, the entire contents of which are incorporated herein for all purposes by these references.

BACKGROUND OF THE INVENTION

Field of the Invention

The present invention relates to a multi-zone air conditioner system for large vehicles and a control method thereof, and more particularly, to a multi-zone air conditioner system for large vehicles and a control method thereof, in which an air conditioning device independently cooling each zone, a detecting device, and an input device switching an operating state of the air conditioning device to an automatic mode or a manual mode are provided to implement independent cooling according to boarding positions of bus occupants, the number of bus occupants, and personal preferences of bus occupants and the zones are subdivided into the front, rear, left, right, and center to independently control each zone, improving durability and fuel economy of the air conditioner system.

Description of Related Art

A large vehicle including a bus for multiple persons is provided with a cooling device for cooling the internal of the vehicle. To perform the cooling, a roof-mounted air conditioner disposed with a condenser device, an evaporator device, etc., is disposed on a roof of the vehicle.

As illustrated in FIG. 1, the existing air conditioner system having the air conditioner system as described above is mounted on the roof of the large vehicle 1 in which the air conditioning device 3 is integrally formed. Depending on the integrated air conditioner, a single cooling system may be built in a large internal of the large vehicle as a whole.

However, in the present case, since the single air conditioner system needs to be operated as a whole, it is impossible to maintain a proper temperature uniformly throughout the internal by maintaining different temperatures in the respective zones of the internal. As a result, the room temperature that an occupant sitting in the front seat and an occupant sitting in the back seat feel is different, and therefore it is difficult to satisfy the comfort of the occupants as a whole.

Further, the related art that partitions the internal of a large vehicle including a bus and supplies separate cool air through a separate air conditioning device only compares the room temperature of the corresponding zone with the predetermined temperature to operate the air conditioner, and therefore has a problem in that it is not possible to perform cooling according to users' personal preference of the respective zones.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi-zone air conditioner system for large vehicles and a control method thereof, in which the air conditioner system for controlling multiple zones is configured to implement independent cooling according to boarding positions of bus occupants, the number of bus occupants, and personal preferences of bus occupants and the zones are subdivided into the front, rear, left, right, and center to independently control each zone, improving durability and fuel economy of the air conditioner system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with various exemplary embodiments of the present invention, a multi-zone air conditioner system for large vehicles may include an air conditioning device configured to partition an internal of a vehicle into multiple zones to independently cool each zone; a detecting device configured to include a room temperature detector configured for detecting a room temperature of each zone and a photo detector configured for detecting an amount of solar radiation; an input t configured to switch an operating state of the air conditioning device to an automatic mode or a manual mode; and a control device configured to generate a control signal for operating the air conditioning device based on a signal transmitted from the detecting device and the input device.

The multi-zone may be re-partitioned into at least one zone according to a room temperature of each zone of the vehicle, an amount of solar radiation, a boarding position of an occupant, the number of occupants, and an occupant's personal preference.

The air conditioning device may be operated in a 1-zone mode by the manual mode when the re-partitioned multi-zone is formed as one zone.

The air conditioning device may be operated in a 2-zone mode by the manual mode when the re-partitioned multi-zone is formed as two zones of front and rear or left and right according to the boarding position of the occupant.

In a zone in which a boarding density of passengers is high, the air conditioning device may be operated depending on a predetermined reference temperature and in a zone in which the boarding density of occupants is low, the air condition device may be operated intermittently.

The air conditioning device may be operated in a 2-zone mode by the manual mode when the re-partitioned multi-zone is formed as two zones of front and rear or left and right according to occupant's personal preference.

In a zone in which weak cooling is preferred, a level of a blower of the air conditioning device may be set to be low and a reference temperature may be set to be high.

In a zone in which strong cooling is preferred, a level of a blower of the air conditioning device may be set to be high and a reference temperature may be set to be low.

When the automatic mode is selected, the re-partitioned multi-zone may be formed as six zones by front, rear, center, left, and right of the vehicle.

In the six zones, the air conditioning device may be operated depending on a predetermined reference temperature, and blowers of the air conditioning devices in each zone are operated independently.

In accordance with various exemplary embodiments of the present invention, a control method of a multi-zone air conditioner system for large vehicles including an air conditioning device partitioning an internal of the vehicle into multiple zones to independently cool each zone, the control method may include switching an operating state of an air conditioning device to a manual mode; re-partitioning the multi-zone into at least one zone according to a room temperature of each zone of the vehicle, an amount of solar radiation, a boarding position of an occupant, the number of occupants, and an occupant's personal preference; and operating the air conditioning device in a 1-zone mode by the manual mode when the re-partitioned multi-zone is formed as one zone and operating the air conditioning device in a 2-zone mode by the manual mode when the re-partitioned multi-zone is formed as two zones of front and right or left and right.

In accordance with various exemplary embodiments of the present invention, a control method of a multi-zone air conditioner system for large vehicles including an air conditioning device partitioning an internal of the vehicle into multiple zones to independently cool each zone, the control method may include switching an operating state of the air conditioning device to an automatic mode; acquiring a use condition of the air conditioning device; confirming whether or not the air conditioning device is operated depending on a room temperature of each zone; confirming whether or not the air conditioning device is operated depending on the amount of solar radiation for each zone; and confirming whether or not the air conditioning device is re-operated depending on the room temperature of each zone.

The acquiring of the use condition of the air conditioning device may include: confirming an external temperature of the vehicle; and determining whether or not the external temperature of the vehicle is equal to or higher than a predetermined temperature.

The confirming whether or not the air conditioning device is operated depending on the room temperature of each zone may include: confirming the room temperature of each zone; and determining whether the room temperature of each zone is equal to or higher than the predetermined temperature.

The air conditioning device may not be operated in the corresponding zone when the room temperature of each zone is less than the predetermined temperature.

The confirming whether or not the air conditioning device is operated depending on the amount of solar radiation for each zone may include: confirming the amount of solar radiation for each zone; and determining whether the amount of solar radiation for each zone is equal to or more than a predetermined amount of solar radiation by temperature.

The air conditioning device may not be operated in the corresponding zone when it is determined that the amount of solar radiation for each zone is less than the predetermined amount of solar radiation by temperature.

The air conditioning device may be operated in the corresponding zone when it is determined that the amount of solar radiation for each zone is equal to or greater than the predetermined amount of solar radiation by temperature.

In the confirming whether or not the air conditioning device is re-operated depending on the room temperature of each zone, the operation of the air conditioning device may be maintained in the corresponding zone when the room temperature of each zone is equal to or higher than the predetermined temperature.

In the confirming whether or not the air conditioning device is re-operated depending on the room temperature of each zone, the air conditioning device may not be operated in the corresponding zone when the room temperature of each zone is less than the predetermined temperature.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
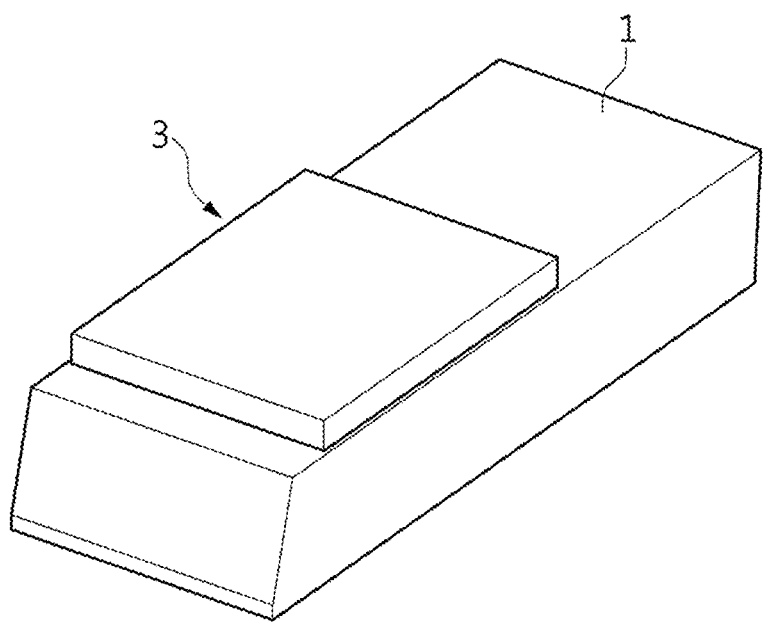
FIG. 1 is a view illustrating an air conditioner apparatus for large vehicles according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms and words used in the present specification and claims described below are not to be construed as a general or dictionary meaning but are to be construed meaning and concepts meeting the technical ideas of the present invention based on a principle that the inventors can appropriately define the concepts of terms to describe their own inventions in best mode. Therefore, the configurations described in the exemplary embodiments and drawings of the present invention are merely most preferable embodiments but do not represent all of the technical spirit of the present invention. Thus, the present invention may be construed as including all the changes, equivalents, and substitutions included in the spirit and scope of the present invention at the time of filing the present application. Terms used in the specification, 'first', 'second', etc., may be used to describe various components, but the components are not to be construed as being limited to the terms.

Figure 2:
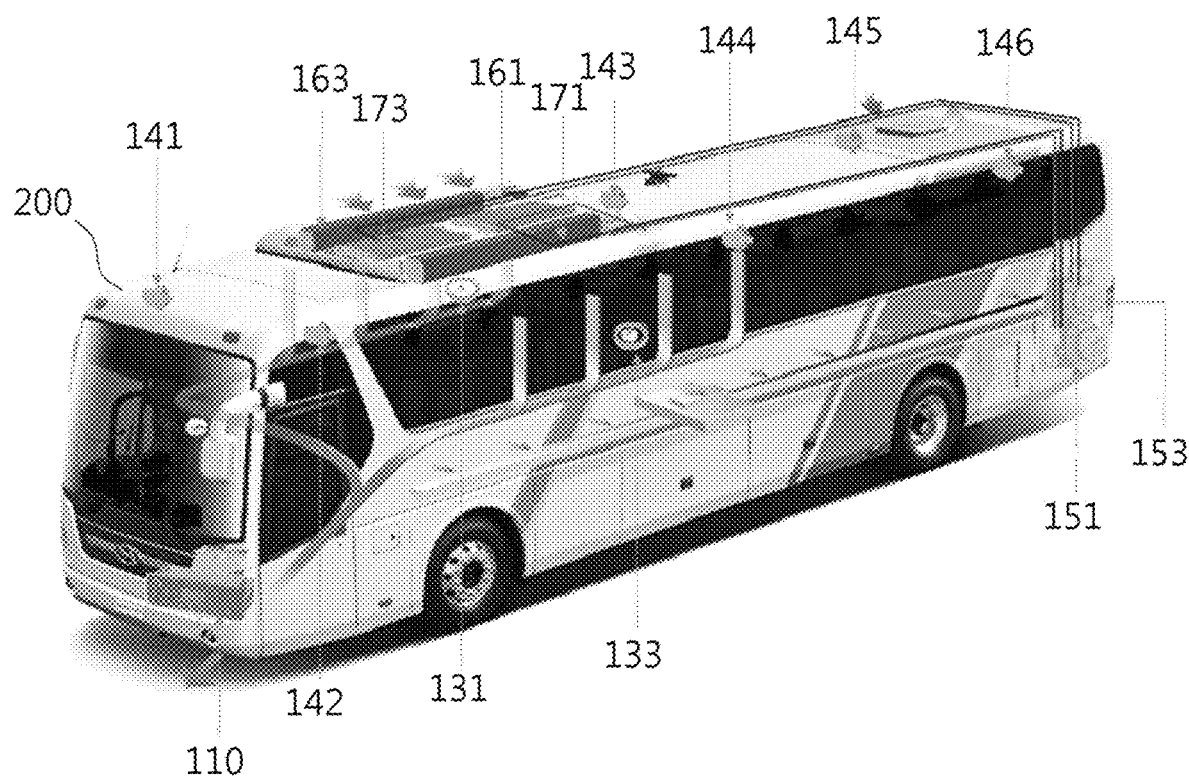
FIG. 2 is a perspective view illustrating a multi-zone air conditioner system for large vehicles according to an exemplary embodiment of the present invention.
Figure 3:
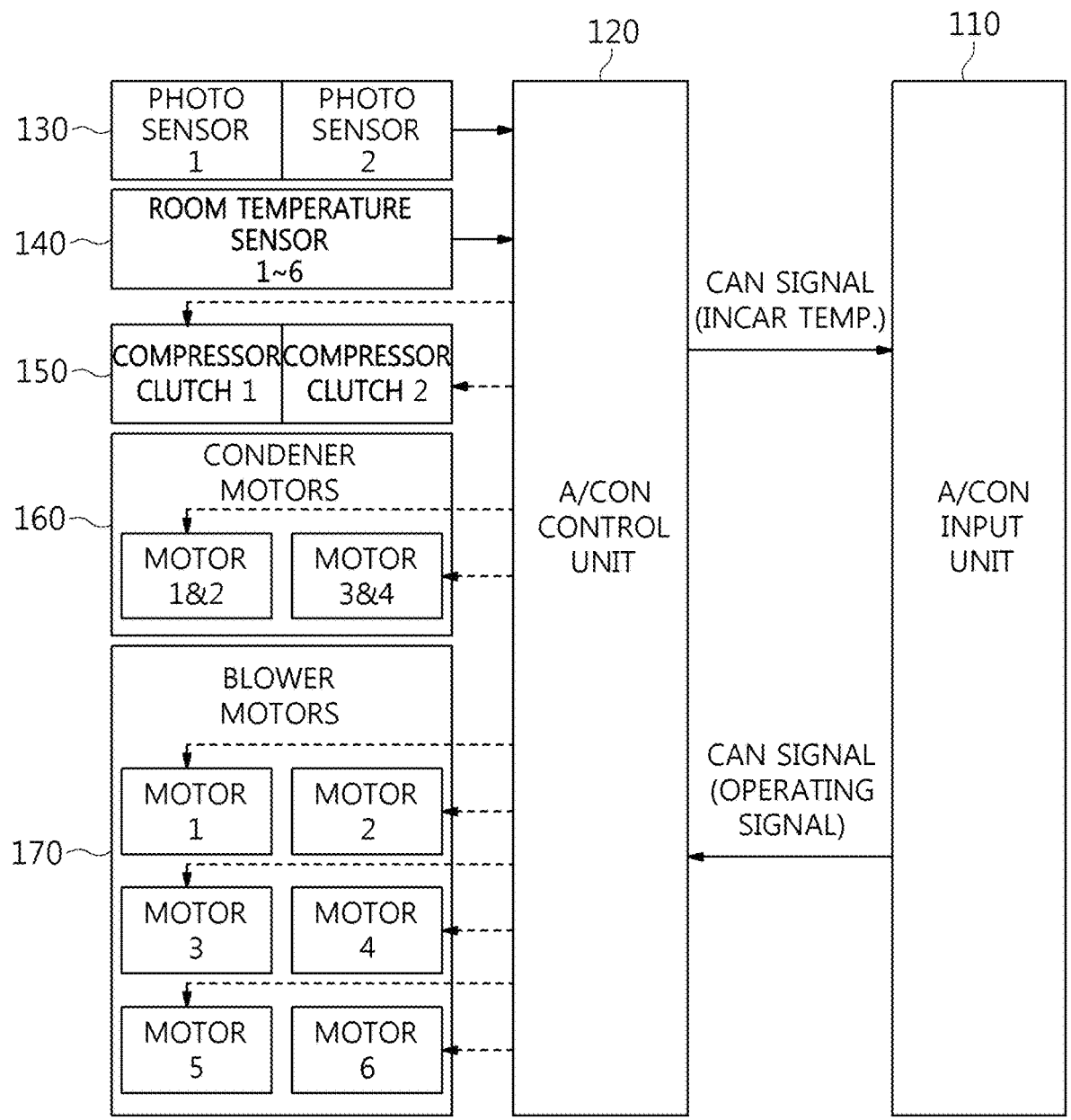
FIG. 3 is a block diagram illustrating the multi-zone air conditioner system for large vehicles according to the exemplary embodiment of the present invention.

FIG. 2 is a perspective view illustrating a multi-zone air conditioner system for large vehicles according to an exemplary embodiment of the present invention, and FIG. 3 is a block diagram illustrating the multi-zone air conditioner system for large vehicles according to the exemplary embodiment of the present invention.

Referring to FIG. 2 and FIG. 3, a multi-zone air conditioner system for large vehicles according to an exemplary embodiment of the present invention may include air conditioning devices 150, 160, and 170 configured to partition an internal of a vehicle into multiple zones to independently cool each zone; a detecting device configured to include a room temperature detector 140 detecting a room temperature of each zone and a photo detector 130 detecting an amount of solar radiation; an input device 110 configured to switch an operating state of the air conditioning device to an automatic mode or a manual mode; and a control device 120 configured to generate control signals for operating the air conditioning devices 150, 160, and 170 based on signals transmitted from the detecting devices 130 and 140 and the input device 110.

The input device 110 is a panel operated by a driver and includes a 1-zone mode button 111, an automatic mode button 112, an air volume adjusting device 113, a temperature setting device 114, an FR zone button 115, and an RR zone button 116.

The control device 120 may be formed as a full automatic temperature control system (FATC), for example.

The photo detector 130 that detects the amount of solar radiation may be formed as a thermosensitive semiconductor that detects a temperature of sunlight or may detect the intensity of sunlight. The photo detector 130 may be formed on both sides of the center (LH/RH) of the vehicle, but may be formed at more locations than that.

The photo detector 130 measures the amount of solar radiation in the automatic mode and determines whether or not the amount of solar radiation is a predetermined amount of solar radiation by temperature. When it is determined that the amount of solar radiation is appropriate, a blower and the air conditioning device are operated.

The room temperature detector 140 may measure the temperature of each zone (six zones) in real time and transmit the measured temperature to the control device 120 and may be formed in six corresponding to the number of set zones. The room temperature detector 140 may be formed as a thermal imaging camera or the like.

Although the air conditioning device is configured to include the compressor 150, the condenser 160, and the blower motor 170, the air conditioning device may be configured to include the compressor 150 and the condenser 160, wherein a pipe connecting between the compressor 150 and the condenser 160 may be formed as two paths.

Although the air conditioning device is illustrated as being formed in two, it is needless to say that the air conditioning device may be formed in a plurality of air conditioners depending on a size of the vehicle.

The blower motor 170 is formed to correspond to each zone, and may be formed in, for example, six when the internal of the vehicle is partitioned into six zones.

When the internal of the vehicle 200 is partitioned into six zones, the multi-zone may be re-partitioned into at least one but no more than six according to the room temperature of each of the six zones, an amount of solar radiation, boarding positions of occupants, and occupant's personal preference.

Figure 4A:
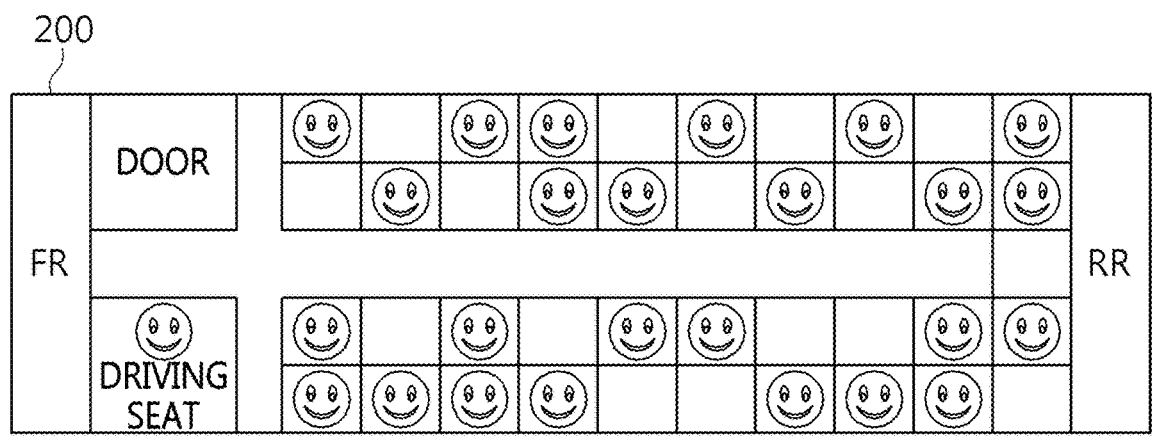
FIG. 4A, FIG. 4B, and FIG. 4C are diagrams illustrating a multi-zone air conditioner system for large vehicles according to various exemplary embodiments of the present invention.
Figure 4B:
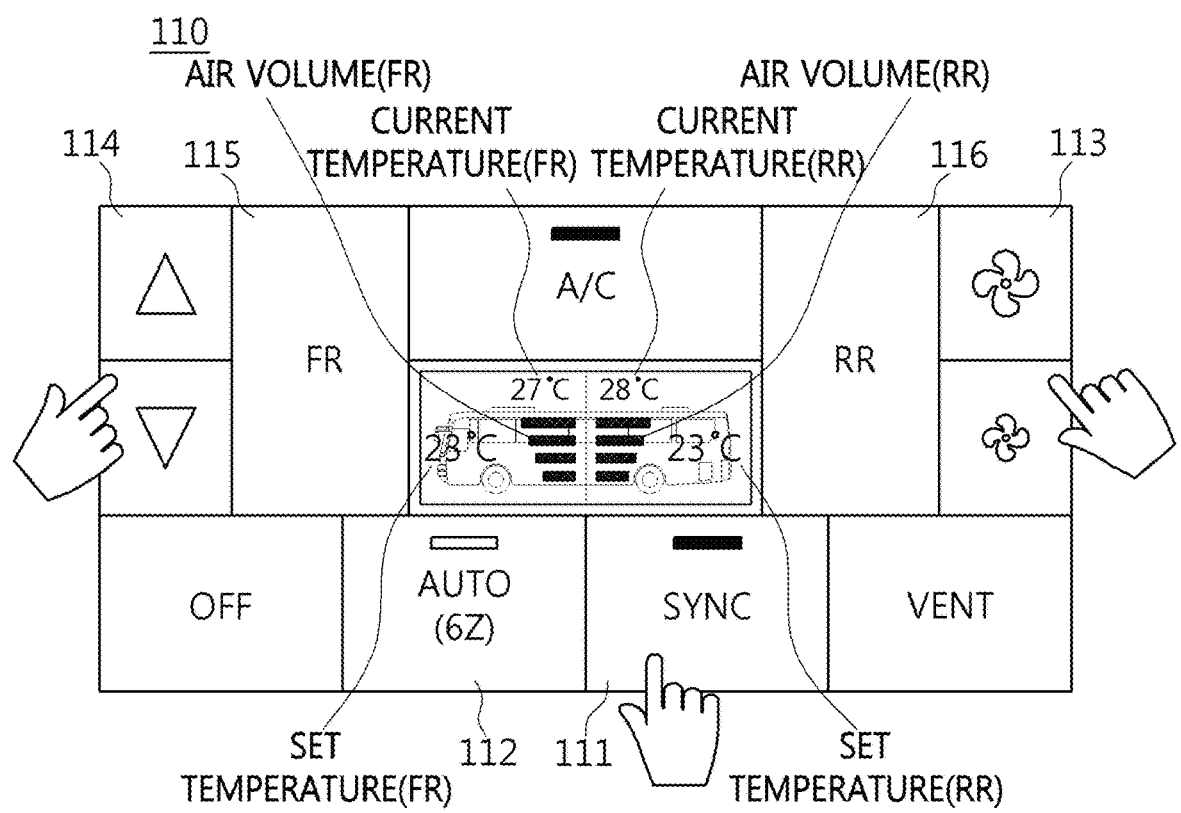
Figure 4C:
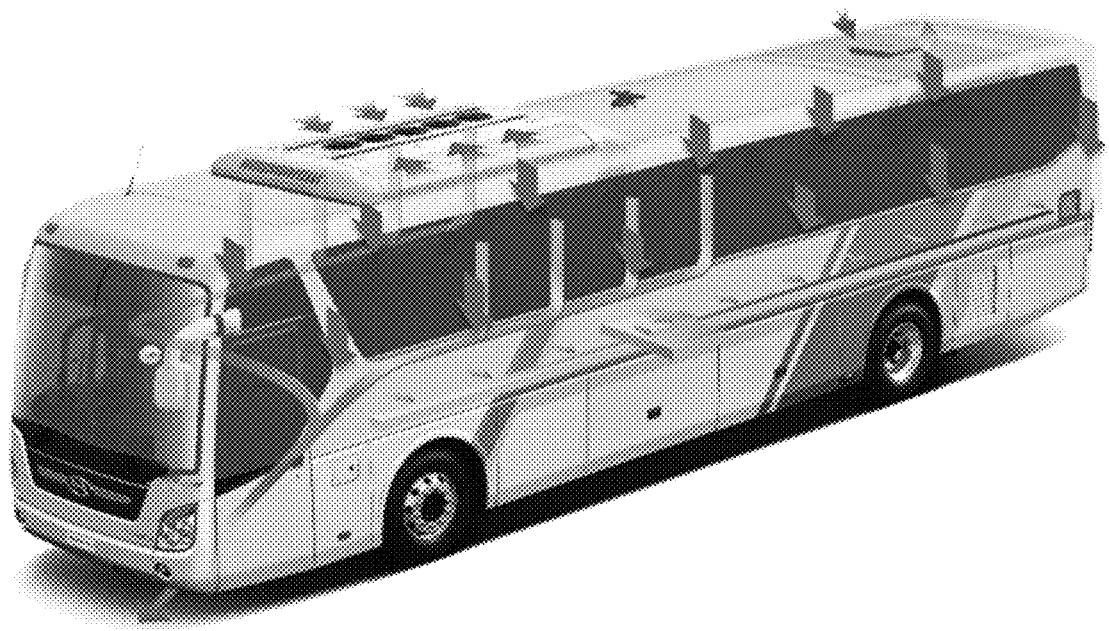

FIG. 4A, FIG. 4B, and FIG. 4C are diagrams illustrating a first example of the multi-zone air conditioner system for large vehicles according to the exemplary embodiment of the present invention.

Referring to FIG. 4A, FIG. 4B, and FIG. 4C, according to the various exemplary embodiments, when the re-partitioned multi-zone is formed as one zone, the air conditioning device is operated in the 1-zone mode by the manual mode.

The various exemplary embodiments corresponds to a case where occupants are evenly distributed between a front (FR) of the vehicle and a rear (RR) of the vehicle. Here, when the 1-zone mode button 111 is pressed to turn on, a 1-zone manual mode is activated, the temperature setting device 114 sets a temperature, and the air volume adjusting device 113 adjusts a blower air volume to be able to maintain the comfort of the vehicle.

As a result, the air conditioning device is manually operated up to the predetermined temperature throughout the entire area of the internal of the vehicle and the air conditioning device is turned off when the temperature of the internal of the vehicle reaches the predetermined temperature.

Figure 5A:
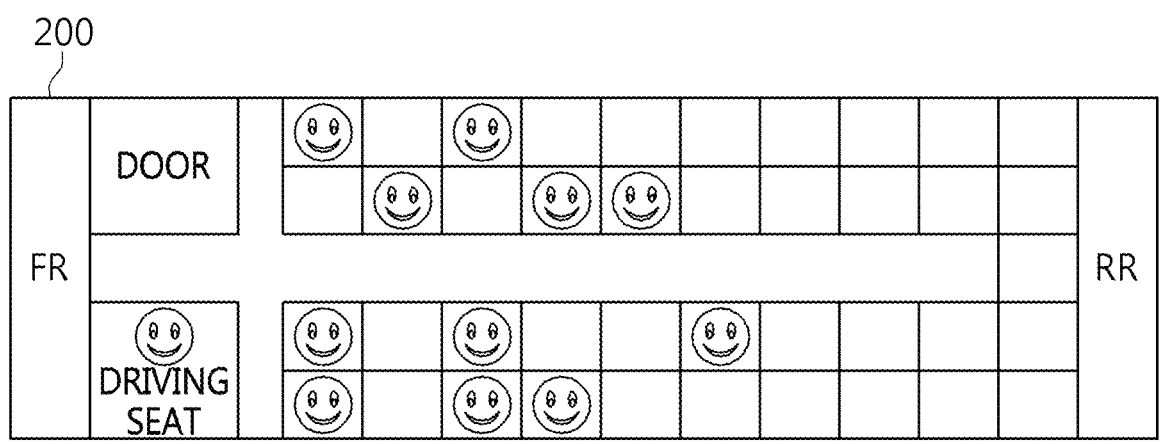
FIG. 5A, FIG. 5B, and FIG. 5C are diagrams illustrating a multi-zone air conditioner system for large vehicles according to various exemplary embodiments of the present invention.
Figure 5B:
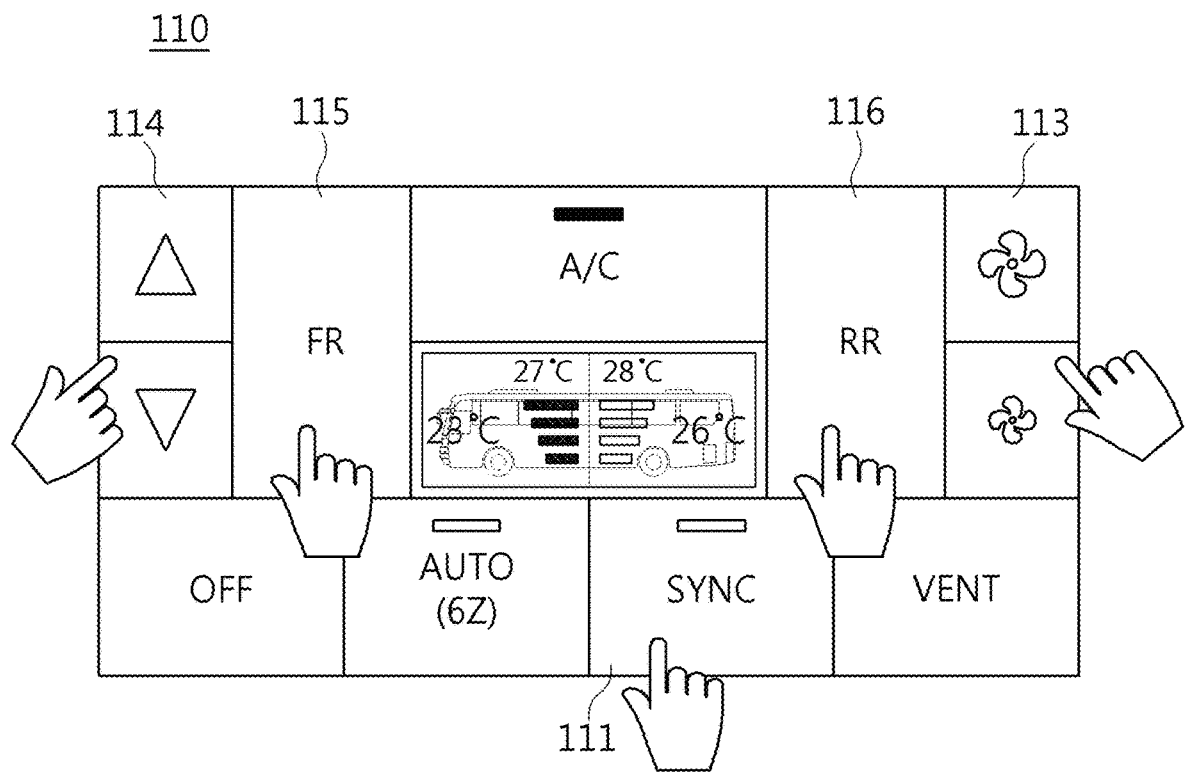
Figure 5C:
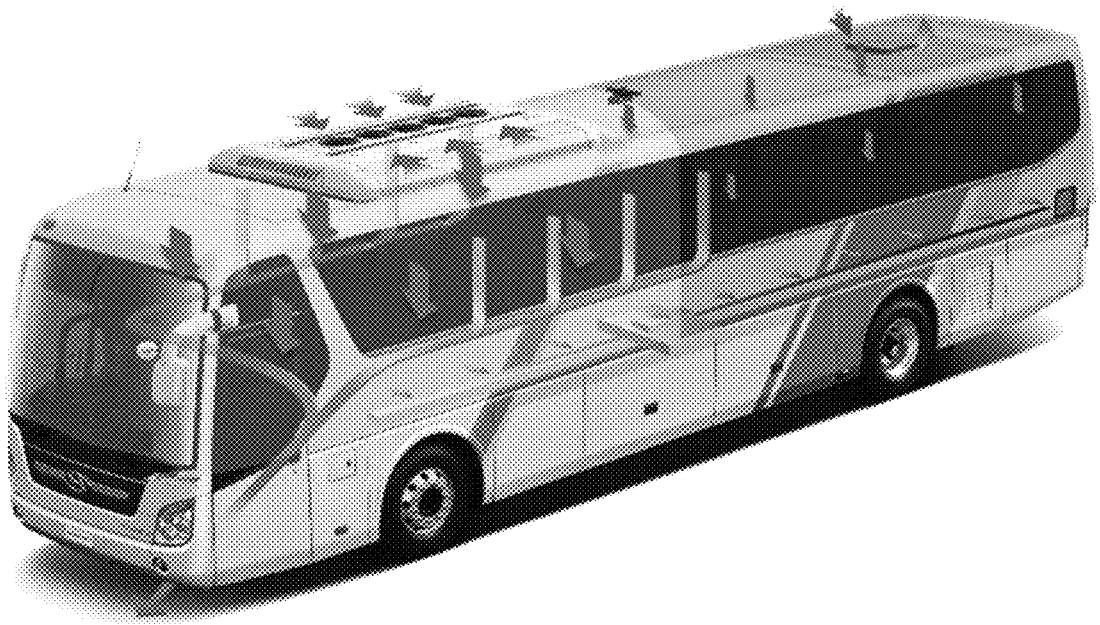

FIG. 5A, FIG. 5B, and FIG. 5C are diagrams illustrating a multi-zone air conditioner system for large vehicles according to various exemplary embodiments of the present invention.

Referring to FIG. 5A, FIG. 5B, and FIG. 5C, according to the various exemplary embodiments, when the re-partitioned multi-zone is formed as two zones, the air conditioning device is operated in a 2-zone mode by the manual mode.

The air conditioning device is operated in the 2-zone mode by the manual mode when the re-partitioned multi-zone is formed as two zones of front and rear or left and right according to the boarding positions of occupants, and in the zone in which a boarding density of occupants is high, the air conditioning device is operated depending on the predetermined reference temperature and in the zone in which the boarding density of occupants is low, the air condition device is operated intermittently.

In the present case, the 1-zone mode button 110 is pressed to turn off, or the FR zone button 115 or the RR zone button 116 is pressed to activate the 2-zone manual mode. The FR zone button 115 or the RR zone button 116 is pressed and then the temperature setting device 114 is pressed to set the temperature of the corresponding zone in which the boarding density of occupants is high, and the air volume adjusting device 113 is pressed to adjust the blower air volume of the corresponding zone in which the boarding density of occupants is high.

Therefore, in the zone in which the boarding density of occupants is high by manually partitioning the internal of the vehicle into two zones, the air conditioning device may be operated and in the zone in which the boarding density of occupants is low, the blower may be intermittently operated to protect the air conditioning device.

Figure 6A:
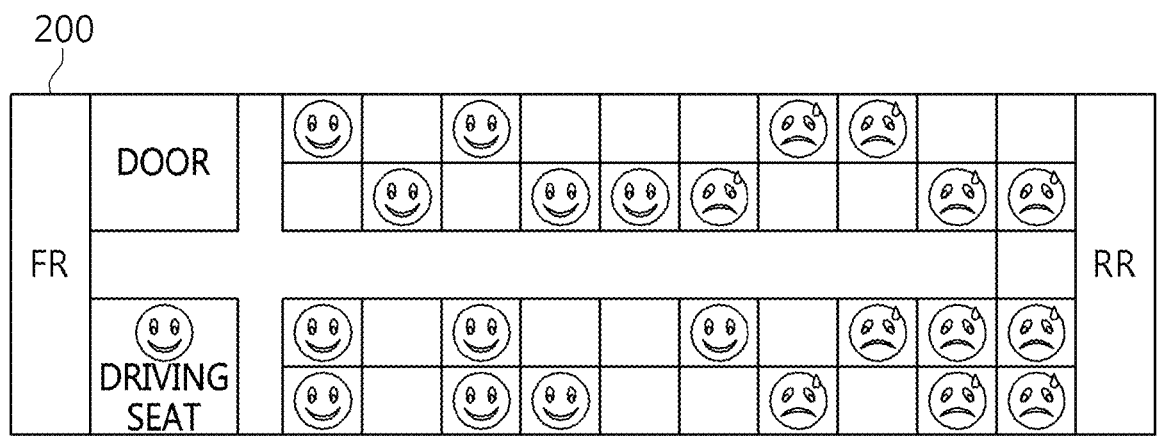
FIG. 6A, FIG. 6B, and FIG. 6C are diagrams illustrating a multi-zone air conditioner system for large vehicles according to various exemplary embodiments of the present invention.
Figure 6B:
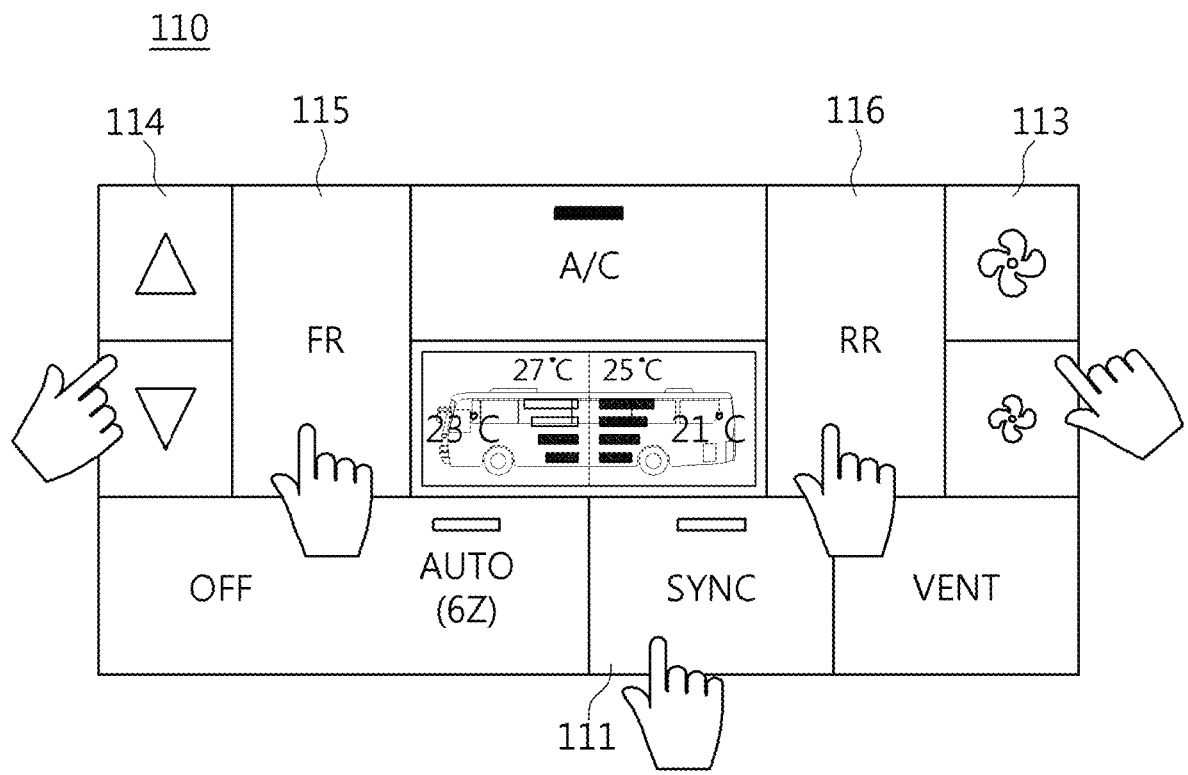
Figure 6C:

FIG. 6A, FIG. 6B, and FIG. 6C are diagrams illustrating a multi-zone air conditioner system for large vehicles according to various exemplary embodiments of the present invention.

Referring to FIG. 6A, FIG. 6B, and FIG. 6C, according to the various exemplary embodiments, when the re-partitioned multi-zone is formed as two zones of front and rear or left and right according to occupants' personal preference, the air conditioning device is driven in the 2-zone mode by the manual mode.

In the present case, the 1-zone mode button 110 is pressed to turn off or the FR zone button 115 or the RR zone button 116 is pressed to activate the 2-zone manual mode, the FR zone button 115 or the RR zone button 116 is pressed and then the temperature setting device 114 is pressed to set the temperature of the corresponding zone according to occupants' personal preference, and the air volume adjusting device 113 is pressed to adjust the blower air volume of the corresponding zone according to occupants' personal preference.

That is, according to the first to various exemplary embodiments, the multi-zone air conditioner system for large vehicles may be operated by a first control method.

The first control method may include: switching an operating state of an air conditioning device to a manual mode; re-partitioning the multi-zone into at least one zone according to a room temperature of each zone of the vehicle, an amount of solar radiation, boarding positions of occupants, the number of occupants, and occupants' personal preference; and operating the air conditioning device in a 1-zone mode by the manual mode when the re-partitioned multi-zone is formed as one zone, and operating the air conditioning device in a 2-zone mode by the manual mode when the re-partitioned multi-zone is formed as two zones of front and right or left and right.

As a result, in the zone that needs to be cooled weekly by manually partitioning the internal of the vehicle into two zones, a level of the blower of the air conditioning device is set to be high and the reference temperature is set to be low.

Figure 7A:
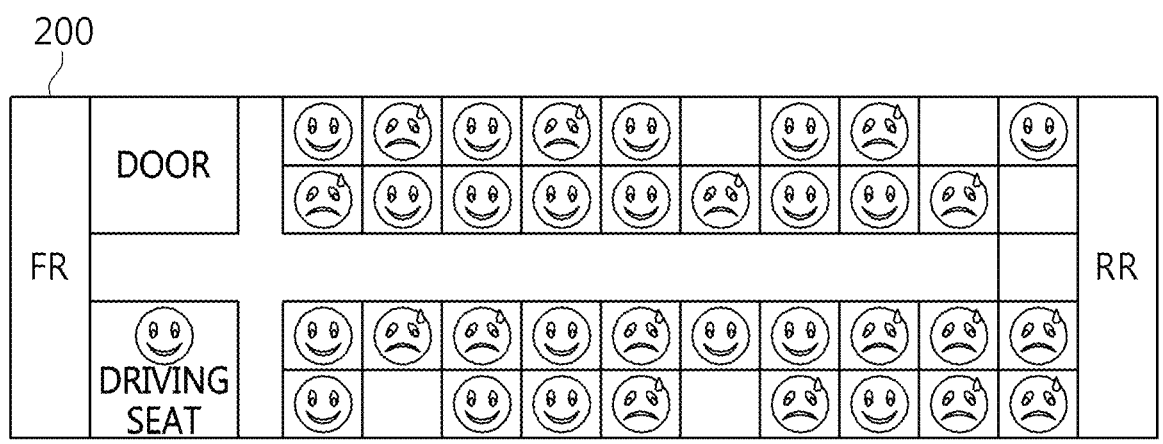
FIG. 7A, FIG. 7B, and FIG. 7C are diagrams illustrating a multi-zone air conditioner system for large vehicles according to various exemplary embodiments of the present invention.
Figure 7B:
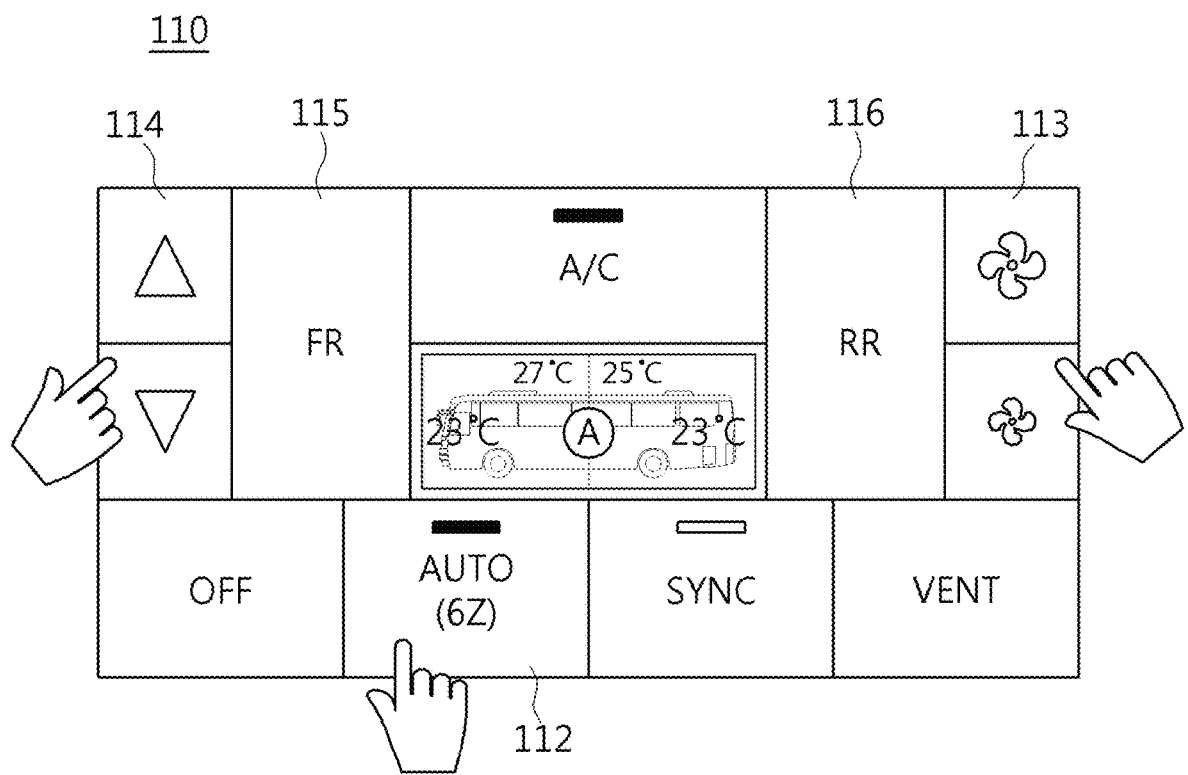
Figure 7C:
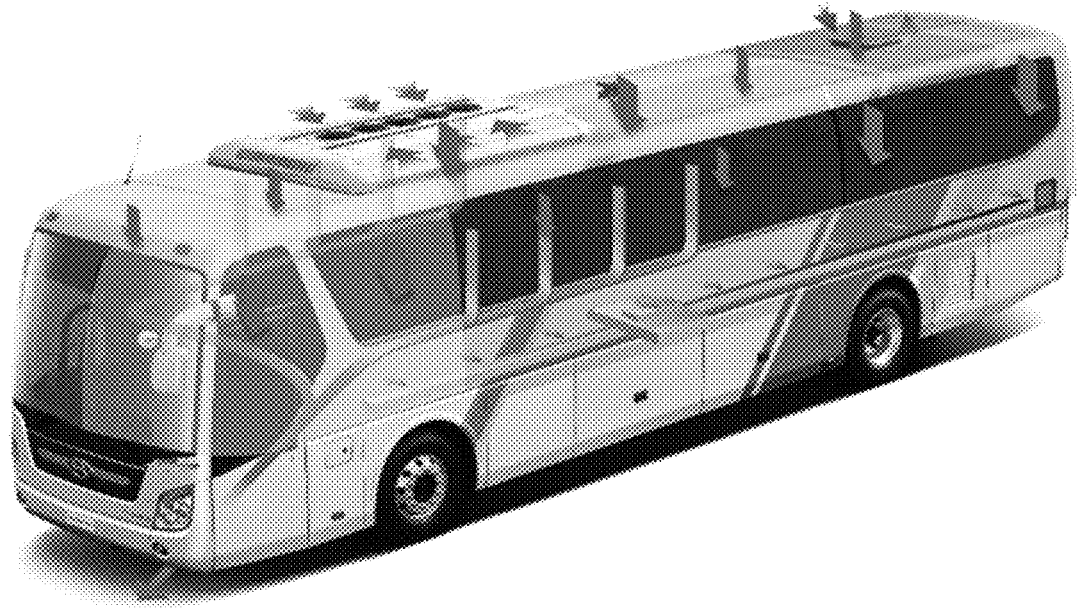

FIG. 7A, FIG. 7B, and FIG. 7C are diagrams illustrating a multi-zone air conditioner system for large vehicles according to various exemplary embodiments of the present invention.

Referring to FIG. 7A, FIG. 7B, and FIG. 7C, according to the various exemplary embodiments, when the automatic mode is selected, the re-partitioned multi-zone is formed as six zones by the front, rear, center, left, and right of the vehicle.

In the six zones, the air conditioning device is operated depending on the predetermined reference temperature, and the blowers of the air conditioning devices in each zone are operated independently.

In the present case, a 6-zone automatic mode is activated by pressing the automatic mode button 112, and six blowers are separately controlled by the air volume adjusting devices 113 wherein the 6 zones reach the predetermined temperature.

At the present point, all the zones of the internal of the vehicle may be set to be the same temperature wherein temperature deviations in each zone may be corrected, and the temperature of each zone may be set to be different to operate the air conditioning device according to the personal preference of each zone.

Figure 8:
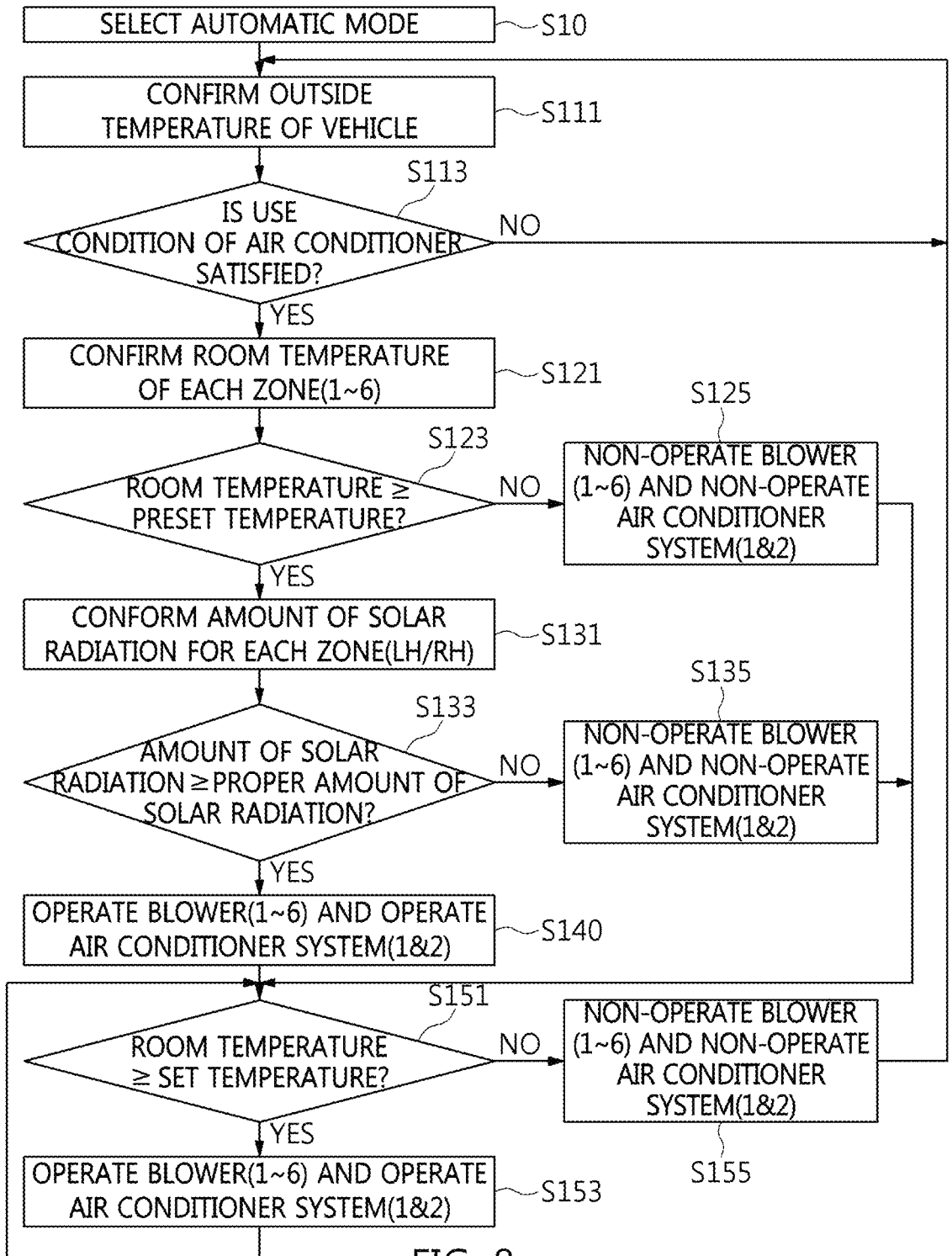
FIG. 8 is a flow chart illustrating a control method of a multi-zone air conditioner system for large vehicles according to the exemplary embodiment illustrated in FIG. 7A, FIG. 7B, and FIG. 7C.

FIG. 8 is a flow chart illustrating a control method of a multi-zone air conditioner system for large vehicles according to the embodiment illustrated in FIG. 7A, FIG. 7B, and FIG. 7C.

A second control method of the multi-zone air conditioner system of large vehicles according to FIG. 8 may include switching an operating state of an air conditioning device to an automatic mode (S10); acquiring a use condition of the air conditioning device (S111 and S113); confirming whether or not the air conditioning device is operated depending on a room temperature detector of each zone (S121 and S123); confirming whether or not the air conditioning device is operated depending on the amount of solar radiation for each zone (S131 and S133); and confirming whether or not the air conditioning device is re-operated depending on the room temperature of each zone (S151 and S153).

In the step S10, the automatic mode button 112 is pressed to activate the 6-zone automatic mode.

The steps S111 and S113 include confirming an external temperature of the vehicle (S111) and determining whether or not the external temperature of the vehicle is equal to or higher than the predetermined temperature (S113).

Here, the predetermined temperature is 17° C., but when the external temperature of the vehicle is less than 17° C., the air conditioning device is not operated.

The steps S121 and S123 include confirming the room temperature of each zone (S121) and determining whether or not the room temperature of each zone is equal to or higher than the predetermined temperature (S123).

When the room temperature of each zone is less than the predetermined temperature, the air conditioning device may not be operated in the corresponding zone.

When the room temperature is equal to or higher than the predetermined temperature, the air conditioning device is operated.

The steps S131 and S133 include confirming the amount of solar radiation for each zone (S131) and determining whether or not the amount of solar radiation for each zone is equal to or greater than the predetermined amount of solar radiation by temperature (S133).

When it is determined that the amount of solar radiation for each zone is less than the predetermined amount of solar radiation by temperature, the air conditioning device is not operated in the corresponding zone, and when it is determined that the amount of solar radiation for each zone is equal to or greater than the predetermined amount of solar radiation by temperature, the air conditioning device is operated in the corresponding zone.

In the steps S151 and S153, when it is determined that the room temperature of each zone is equal to or higher than the predetermined temperature, the operation of the air conditioning device is maintained in the corresponding zone, and in the steps S151 and S153, when it is determined that the room temperature of each zone is less than the predetermined temperature, the air conditioning device is not operated in the corresponding zone.

According to the exemplary embodiment of the present invention, the air conditioner system for controlling the multiple zones is configured to implement the independent cooling according to the boarding positions of bus occupants, the number of bus occupants, and the personal preference of bus occupants and the zones are subdivided into the front, rear, left, right, and center to independently control each zone, improving the durability and the fuel economy of the air conditioner system.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-zone air conditioner system for a vehicle, the multi-zone air conditioner system comprising:
    an air conditioning device configured to partition an interior of the vehicle into a plurality of zones to independently cool each zone;
    a detecting device including a room temperature detector configured for detecting a room temperature of each zone and a photo detector configured for detecting an amount of solar radiation;
    an input device configured to switch an operating state of the air conditioning device to an automatic mode or a manual mode; and
    a control device configured to generate a control signal for operating the air conditioning device based on a signal transmitted from the detecting device and a signal from the input device,
    wherein the plurality of zones is re-partitioned into at least one zone according to the room temperature of each zone of the vehicle, the amount of solar radiation, a boarding position of at least one occupant, a number of the at least one occupant, and personal preference of the at least one occupant,
    wherein the air conditioning device is operated in a 2-zone mode by the manual mode when the re-partitioned plurality of zones is formed as two zones of front and rear or left and right according to the boarding position of the at least one occupant,
    wherein in a zone in which a boarding density of the at least one occupant is higher than a predetermined value, the air conditioning device is operated depending on a predetermined reference temperature and in a zone in which the boarding density of the at least one occupant is lower than the predetermined value, the air conditioning device is operated intermittently, and
    wherein each zone comprises plurality of seats.

2. The multi-zone air conditioner system of claim 1, wherein the air conditioning device is operated in a 1-zone mode by the manual mode when the re-partitioned plurality of zones is formed as one zone.

3. The multi-zone air conditioner system of claim 1, wherein in a zone in which weak cooling is preferred, a level of a blower of the air conditioning device is set to be lower than a predetermined value and a reference temperature is set to be higher than a predetermined value.

4. The multi-zone air conditioner system of claim 1, wherein in a zone in which strong cooling is preferred, a level of a blower of the air conditioning device is set to be high and a reference temperature is set to be low.

5. The multi-zone air conditioner system of claim 1, wherein, when the automatic mode is selected, the re-partitioned plurality of zones is formed as six zones by front, center, and rear for each of the left and right of the interior.

6. The multi-zone air conditioner system of claim 5, wherein in the six zones, the air conditioning device is operated depending on the predetermined reference temperature, and blowers of the air conditioning device in each zone are operated independently.

* * * * *